(12) United States Patent
Kindlund et al.

(10) Patent No.: US 8,444,851 B2
(45) Date of Patent: May 21, 2013

(54) SYSTEM FOR RECEPTION AND TRANSPORT OF LIME MUD FROM A WHITE LIQUOR FILTER

(75) Inventors: Soren Kindlund, Karlstad (SE); Michael A. Rowe, Karlstad (SE); Hans Barthelson, Karlstad (SE)

(73) Assignee: Metso Paper Sweden AB, Sundsvall (SE)

( * ) Notice: Subject to any disclaimer, the term of this patent is extended or adjusted under 35 U.S.C. 154(b) by 402 days.

(21) Appl. No.: 12/745,552

(22) PCT Filed: Dec. 4, 2008

(86) PCT No.: PCT/SE2008/051406
§ 371 (c)(1),
(2), (4) Date: Sep. 7, 2010

(87) PCT Pub. No.: WO2009/072978
PCT Pub. Date: Jun. 11, 2009

(65) Prior Publication Data
US 2011/0000834 A1    Jan. 6, 2011

(30) Foreign Application Priority Data
Dec. 6, 2007    (SE) ....................................... 0702702

(51) Int. Cl.
*B01D 35/00*    (2006.01)
*B01D 21/30*    (2006.01)
*B01D 33/06*    (2006.01)
*D21C 11/00*    (2006.01)

(52) U.S. Cl.
USPC .......... 210/86; 210/107; 210/172.2; 210/181; 210/147; 210/260; 210/808; 210/803; 210/784; 210/768; 210/770; 162/14; 162/16; 162/61

(58) Field of Classification Search
None
See application file for complete search history.

(56) References Cited

U.S. PATENT DOCUMENTS

| | | | |
|---|---|---|---|
| 4,334,786 A * | 6/1982 | Delcoigne et al. | 366/132 |
| 5,989,018 A * | 11/1999 | Ahvenainen | 432/109 |
| 6,170,577 B1 * | 1/2001 | Noles et al. | 166/312 |
| 2004/0069721 A1 * | 4/2004 | Ingelman et al. | 210/767 |
| 2007/0221345 A1 * | 9/2007 | Lownertz | 162/16 |

* cited by examiner

*Primary Examiner* — Nam Nguyen
*Assistant Examiner* — Richard Gurtowski
(74) *Attorney, Agent, or Firm* — Rolf Fasth; Fasth Law Offices

(57) ABSTRACT

The system is for the reception and transport of dry lime mud from a continuously operating pressurized filter in a causticization process. A tube valve is used as an outlet from the pressurized process. The tube valve has a minimum length that is twice a diameter of the tube. A column of lime mud can be held within it as a pressure lock. The column of lime mud can be caused to descend through the tube valve by controlling a difference in pressure between an inner surface and an outer surface of the tube such that the diameter of the tube expands essentially uniformly along its length by 5-10% or by at least 4-6 millimeters.

9 Claims, 2 Drawing Sheets

SYSTEM FOR RECEPTION AND TRANSPORT OF LIME MUD FROM A WHITE LIQUOR FILTER

PRIOR APPLICATION

This application is a U.S. national phase application based on International Application No. PCT/SE2008/051406, filed 4 Dec. 2008.

TECHNICAL AREA

The invention concerns a system for the reception and transport of dry lime mud from a filter medium in a continuously operating pressurised filter in a causticisation process, where white liquor is separated from the lime mud and where the lime mud in a dry state is transported to a lime kiln in a closed system.

BACKGROUND AND SUMMARY OF THE INVENTION

The green liquor that is a process liquor in the causticisation process consists principally of sodium carbonate. The green liquor is caused to react during the process with quicklime, whereby calcium carbonate (lime mud) is formed, together with sodium hydroxide (white liquor). The white liquor is filtered in tube filters or disc filters, where these filters, in particular the latter, are normally of pressurised type. The white liquor obtained is reused in the sulphate process for the cooking of pulp wood chips. The lime mud obtained from the filtration is finally burnt in order to reform quicklime.

As is described in *Chemical Pulping, Book 6B, ISBN 952-5216-06-3* in the section White liquor preparation (pp. B133-B202), the lime mud is conventionally treated after the white liquor filter such that it is formed into a slurry with a consistency of 35-40% and it is stored in storage tanks in order to ensure a steady supply of lime mud to the lime kiln. The lime mud that has been slurried is pumped from these storage tanks to a lime mud dewaterer that is arranged just before the lime kiln, where dewatering of the lime mud slurry takes place to give a level of dry matter content of 65-90%. The dewatering normally takes place in atmospheric drum filters and the lime mud that is scraped from the dewatering filter is transported on transport belts to the lime kiln. This entails a number of unnecessary operations and a certain amount of unnecessary equipment in the form of sludging arrangements, storage tanks and dewaterers.

In continuously operating filtration arrangements for liquid suspensions such as, for example, those described in SE-C,463 771 (equivalent to U.S. Pat. No. 4,929,355), a filter cake in the form of lime mud on a filter medium is formed. This lime mud is scraped off with scrapers (known as "knives") and falls down into a reception chute, where further dilution with dilution liquid is carried out in order for it to be possible to transport the lime mud onwards. An output screw is shown in the said SE-C 463 771, in one embodiment, directly after the reception chute, which screw feeds the mud onwards to a sluice. The sluice is, in a second displayed embodiment, in the form of a storage tank in which the level is monitored, in which tank a mechanical stirrer is placed.

A corresponding solution with storage tank and mechanical mixer is shown in U.S. Pat. No. 5,151,176. Storage tanks and mechanical stirrers are used also in other applications with tube filters, see U.S. Pat. No. 4,264,445, in order to deal with the filter cake that is removed from a pressurised tube filter. It has been considered that the bulky storage tank and the mechanical stirrer arranged within it are necessary in order to be able to retain the lime mud well-mixed with the added dilution liquid and to prevent sedimentation of the lime mud.

An alternative system from Larox OY is shown in WO 97/22752 in which the lime mud is separated from a white liquor filter arranged directly after the causticisation vessel. The lime mud is here stored in a special intermediate silo that has been designed such that it is possible to feed the lime mud in dry state directly to the lime kiln. It is possible to avoid with this type of system the formation of an intermediate slurry from the mud, and there is no dewaterer for the lime mud before the dry lime mud is fed into the lime kiln.

It is thus possible to handle the lime mud after its separation from a mud-containing liquid mixture in its slurried form as specified by conventional technology, or to handle it in its dry state, with a level of dry matter content of 70-80%. The conventional technology will be unnecessarily expensive since several additional stages, such as intermediate storage of the slurried lime mud in silos with continuous stirring and the subsequent dewaterers, are required.

Handling dry lime mud involves very serious problems since the lime mud produces dust and gives rise to environmental problems in the recovery process, and it is also highly wearing for processing equipment since the dry lime mud behaves as a grinding powder. The wear means that handling equipment for dry lime mud from pressurised filtering processes cannot be constructed to use pressurised sluices having mechanical sealing arrangements with small tolerances since these parts wear rapidly. Furthermore, dry lime mud is difficult to handle since the mud has a tendency to clog storage silos and pipe systems. The dry lime mud has for this reason often been handled in open systems that feed the mud to the lime kiln on transport belts or similar. The systems, furthermore, must be able to feed the lime mud to the lime kiln in an even flow, since the kiln can easily damage the ceramic lining by burning, if the kiln is not evenly filled throughout its extent. It is normal to counteract a disturbance in the feed of lime mud by reducing the power of the burner in the lime kiln in order to prevent a poorly filled section of the lime kiln being exposed to a heat load that is too high.

The invention relates to the handling of a finely granulated material, by which is denoted a material for which the particle size is less than 1,000 micrometers (<0.1 cm), preferably less than 100 micrometers, where the material forms a tightly packed structure with a very high pressure differential across a bed that is formed from packing such material. The feed out of dry lime mud is preferentially concerned, the behaviour of which is similar to that of cement powder or flour, and where this finely granulated material forms a compact mass when a bed is constructed.

The invention is based on the insight that a specific tube valve can be used as outlet sluice from a pressurised process from which finely granulated material is fed out, which material otherwise has a tendency to clog the outlet. Through holding the finely granulated material as a unified column, a functional pressure lock is formed in order to ensure that the pressurised process can maintain its working pressure with minimal losses caused by leakage through the outlet.

The purpose of the invention in the form of the system is to provide an output system for finely granulated material from a pressurised process where:
 Pressure losses through the outlet are minimised
 Tendencies for the formation of plugs can be monitored and exploited It is possible to establish a pressure lock without forming the finely granulated material into a slurry (it is not necessary to establish a liquid trap).

A further purpose is to make it possible to feed the dry lime mud directly to the lime kiln during the application for cleaning lime mud.

Further characteristics and aspects and advantages of the invention are made clear by the following description of some putative embodiments.

DETAILED DESCRIPTION OF ONE EMBODIMENT OF THE INVENTION

Figure 1:
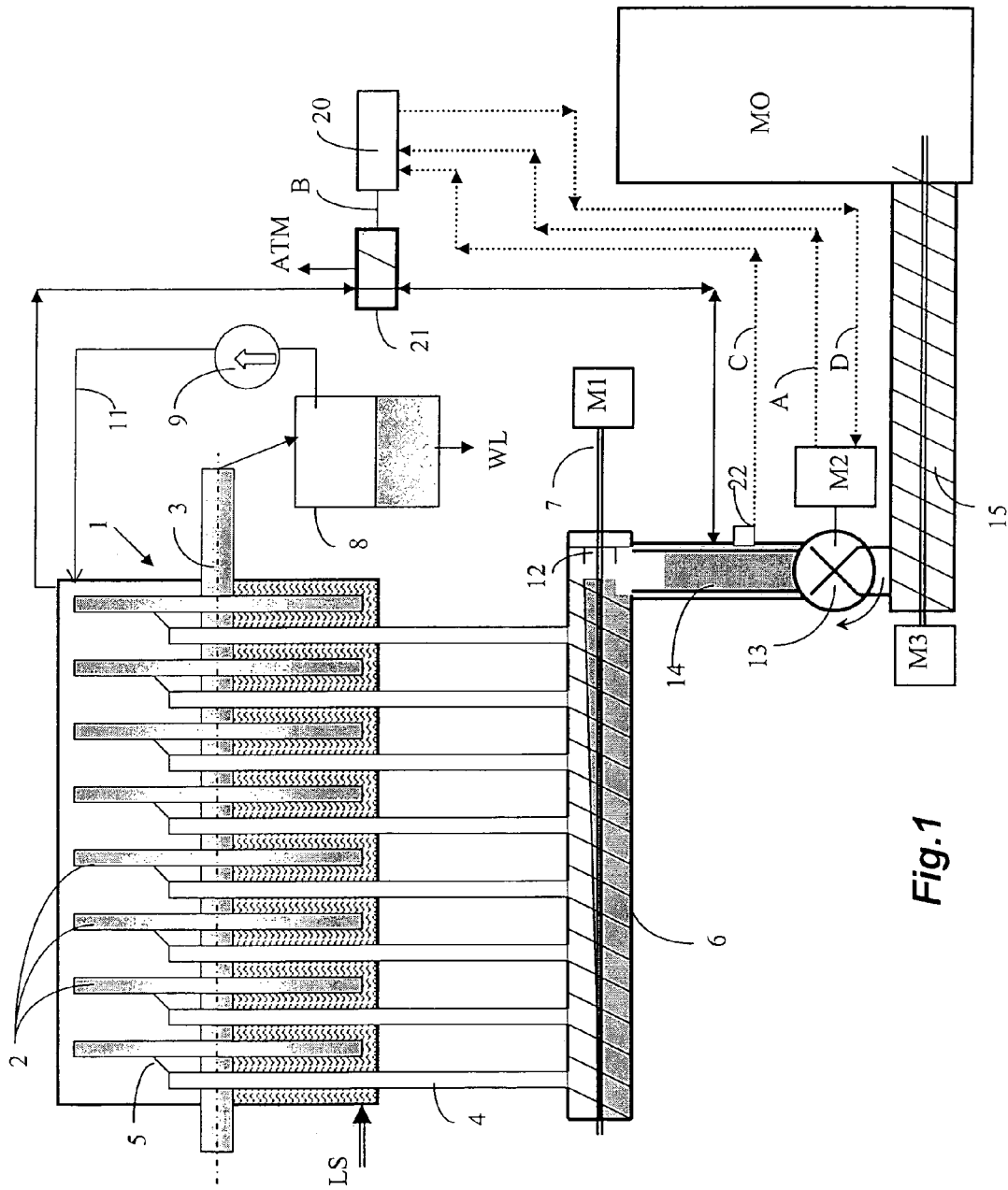
FIG. 1 shows in principle a system according to the invention.

FIG. 1 shows a system according to the invention with a pressurised disc filter 1 to which a slurried mixture of lime mud LS is fed. A number of filter discs 2 are present in the filter whose interior is placed under negative pressure via a hollow shaft 3, which hollow shaft drains the liquid to a liquid tank 8, while a layer of lime mud becomes attached to the surfaces of the filter discs. The difference in pressure is established with a pump 9 that exerts suction on the gas phase of the liquid tank and pressurises the discs via the line 11. The pressure difference that is established across the filter screen of the discs is of the order of magnitude 1-1.5 bar.

In the case in which the filter is a lime mud washer, the liquid is normally constituted by a weak liquor, where this weak liquor contains the residual alkali that may be present in the lime mud mixture LS, and it may be diluted with the cleaning liquid that is sprayed in a conventional manner onto the filter discs.

The dry lime mud that has been applied to the filter discs 2 is scraped off in a conventional manner by knives 5 (scrapers) that are located at a distance from the surfaces of the filter discs 2. These knives 5 normally lie at such a distance from the filter surfaces of the discs that a filter cake is formed on the discs, which then forms a precoat on the filter screen, which gives an improved filtration effect. This precoat can be regenerated at given times by the deep cleaning of a track on the filter cake right into the filter screen using a high-pressure nozzle. A part of the thickness of the filter cake may also be regenerated by the knife passing in towards the filter disc and reducing the thickness of the filter cake to a minimum, with the knife subsequently returning to its original position. One disc at a time can in this way undergo a partial regeneration of the precoat. A second alternative to the cleaning of filters is conventional reverse blowing, which can take place for one disc at a time or for all discs at the same time.

The dry lime mud, which maintains a level of dry matter content of approximately 65-90%, falls down into a first reception chute 4. There is one first reception chute 4 placed under each knife 5 and filter disc 2.

The first reception chute is connected at its lower part to a collection pipe 6 that is essentially horizontal and in which is arranged a first transport screw 7, driven by a motor M1. The dry lime mud is then fed onwards to a pressure-maintaining outlet sluice formed in the vertical shaft after the first transport screw, where a tube valve 14 and a sluice feed 13 are arranged. It is preferable that a plug-breaker 12 is arranged in connection with the upper part of the vertical shaft at the end of the collection pipe 6. The plug-breaker is to finely divide any lumps or plugs that form, and in this way secure the feed to the chute. The plug-breaker 12 may consist either of fixed pegs or a plug-breaker that rotates in the opposite direction to the feed screw 7. It may in this case be provided with a number of wings that break the plug that is fed by the feed screw 7 towards the plug-breaker 12. The plug-breaker may have its own continuously active drive, or it may be driven by the shaft of the feed screw through a reversing gear box.

A tube valve 14 (which is shown in more detail in FIG. 2) together with a sluice feed 13 are used in order to ensure the establishment of a pressure lock. The sluice feed ensures that a certain minimum height of lime mud is established in the tube valve. The tightly packed column of lime mud with finely granulated material that is established in the tube valve leads to a significant fall in pressure, and is exploited as a pressure lock. It has proved to be the case during testing that a tube valve with a diameter of 80-120 mm that maintains a column of lime mud of height 2-3 decimeters can maintain by itself a pressure difference of 1-1.5 bar. The height of column that is necessary for the establishment of a pressure lock is a function of the diameter of the chute, whereby the height of column necessary increases proportionally with the diameter of the chute, where the height of column necessary is at least twice the diameter.

Also a rotating sluice feed 13 driven by a motor M2 is arranged under the tube valve in order to ensure that the column of lime mud does not flow out from the tube valve in an uncontrolled manner. It is preferable that this sluice feed have 3-5 pockets, where the number of pockets is proportional to the size, i.e. the capacity, of the sluice feed. This rotating sluice feed principally ensures that the column of lime mud can be built up during the start-up sequence, and that the column of lime mud is not released in an uncontrolled manner from the tube valve 14 when the tube valve releases its grip around the column of lime mud. Other types of sluice can therefore be used. It is alternatively possible to use a simple membrane valve that is held closed solely during the start-up sequence in order to establish a column of lime mud in the tube valve.

The lime mud falls down after the sluice feed into a second transport screw 15 driven by the motor M3, which feeds the lime mud in the closed transport screw directly to the lime kiln MO.

The tube valve 14 can in the extreme case function without the sluice feed 13, while in this case the transport screw 15 remains stationary during the start-up sequence while a column of lime mud forms in the tube valve. If the tube valve is activated intermittently, the column of lime mud that has been built up can be caused to descend through the tube valve with an intermittent downwards motion where the tube valve alternately grips and releases the column of lime mud.

The tube valve 14 will be described in more detail with reference to FIG. 2, where the tube valve is shown in detail. The tube valve 14 is located arranged between the outlet of the first transport screw and the sluice feed 13, via an upper and a lower flange coupling 140*a*/140*b*.

It is appropriate that a tube adapter 146 be inserted into the tube valve 14, where the internal diameter of the tube adapter essentially corresponds to the internal diameter of the tube valve when the tube is fully expanded, i.e. when the greatest pressure difference between the inner surface and outer surface of the tube has been established.

The tube valve should be mounted with an axial tensile prestress in order for it to achieve the desired function. The tube valve obtains in this manner a waist with the form of an hour-glass.

The flexible inner tube 142 is held in tension in the housing 141 of the tube valve with the aid of an upper clamp ring 144*a* and a lower clamp ring 144b, while the inner tube is subject to axial strain. It is preferable that the flexible inner tube when in its non-loaded initial condition is 3-10% shorter than the distance between the ends of the inner tube when it is in its mounted condition.

A pressure chamber 145 in the form of a ring-shaped gap between the housing 141 of the tube valve and the inner tube 142 is in this way formed.

When the inner tube 142 has its maximal expansion, it will come into contact with the housing 141, and the housing in this way prevents the tube from acquiring a local expansion that is greater than the diameter of the outlet from the chute and that may cause the formation of plugs.

It is appropriate that the flexible inner tube 142 be manufactured from natural rubber or from a similar elastic material that resists wear from the lime mud.

Figure 2:
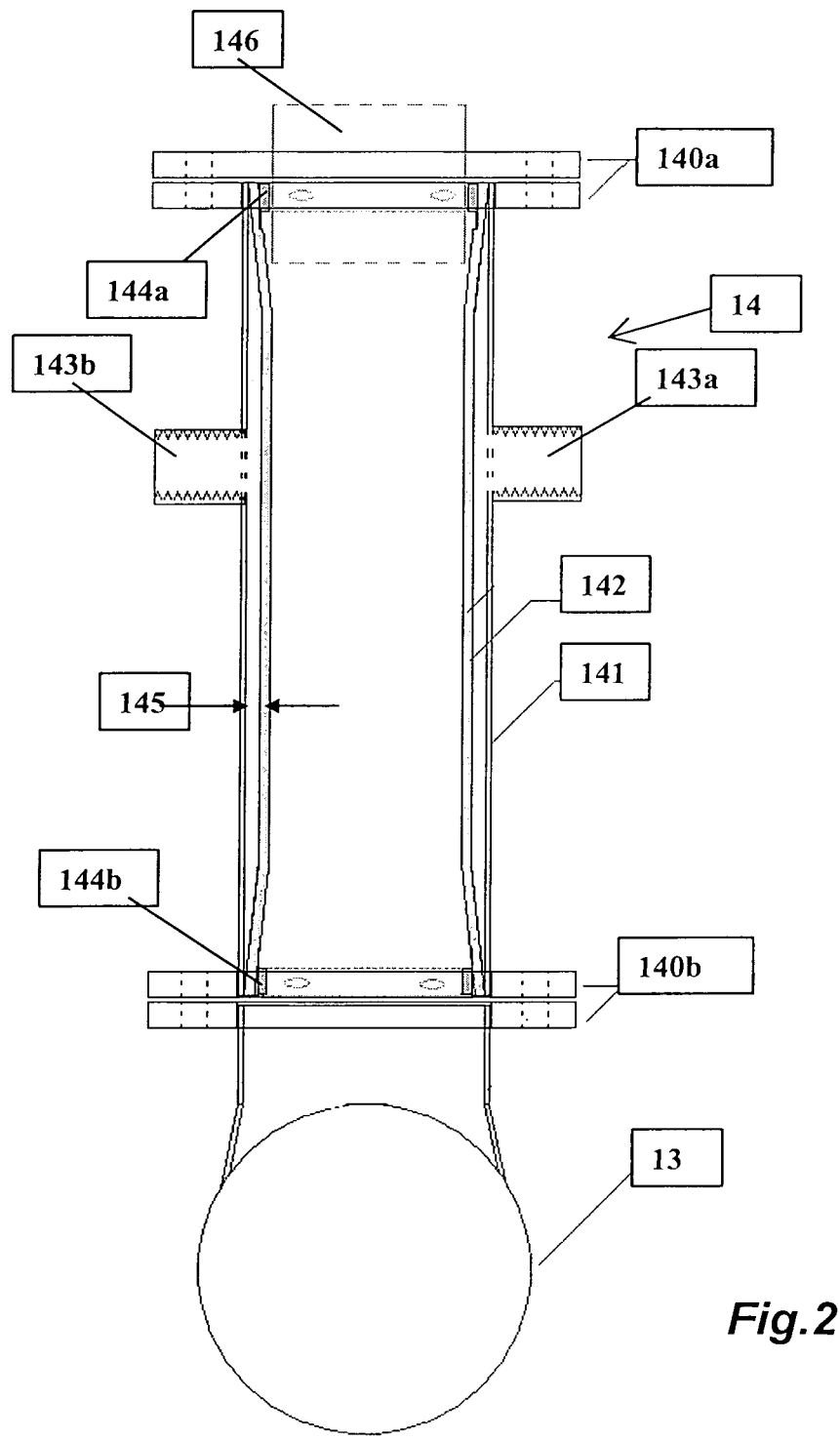
FIG. 2 shows the tube valve.

This prestress allows an initial condition to be achieved in which the tube establishes the gentle hour-glass form shown in FIG. 2 if the same pressure is prevalent within the tube as that present outside of the tube 142. When the pressure outside of the tube subsequently falls, the expansion that results from the prestress takes place concentrically and uniformly along its complete length between the attachment points, without any risk of the tube 142 being subject to local deformation.

It is appropriate that the tube valve have a built height that exceeds to a considerable extent the internal diameter of the tube valve, since the tube valve is to hold a column of finely granulated material that at the same time forms a pressure lock.

The minimum length/$S_{L\_Min}$ (with the built height shown in FIG. 2) of the tube valve relative to the diameter/$S_D$ of the tube valve lies in the interval:

$$2*S_D < S_{L\_Min} < 5*S_D.$$

With a tube valve that in its initial condition (when there is no difference in pressure between the inside and outside) has an internal diameter of just over 10 centimeters, the total length of the tube in its mounted condition is approximately 30-40 centimeters.

At least one connection 143a/143b to a source of pressure that can be regulated is present externally to the tube 142 in order for it to be possible to regulate the tube valve. The connection 143a can, for example, be connected to the atmosphere and the connection 143b to the same pressure that is prevalent in the pressurised filter. By opening the connection in the coupling 143a or 143b, the tube can be placed under pressure externally to the same level as the pressure that is prevalent internally in the tube, or it can be connected to a lower pressure, appropriately atmospheric pressure.

The tube as an alternative may be connected to a reduced excess pressure relative to the pressure in the filter 1, instead of atmospheric pressure.

FIG. 1 shows schematically how the regulation may be carried out with only a single connection, using instead a regulator valve 21 that connects the outer surface of the tube to the same pressure as that prevalent in the filter or to the atmosphere/ATM. The outer surface of the tube is connected in FIG. 1 to the same pressure as that prevalent within the filter, for which reason the tube valve has the same pressure internally as externally to the tube 142, and it takes the form or initial position that is shown in FIG. 2. This results in the tube having its minimum diameter and thus holding the column of lime mud that is formed in the tube valve. As soon as the tube valve is connected to a lower pressure, in the case shown to atmospheric pressure, the difference in pressure between the inner surface and the outer surface of the tube will increase such that the tube expands and releases its hold on the column of lime mud. It is preferable that the release of the tube valve takes place in synchronisation with the position of the sluice feed 13 such that a release is activated when an empty pocket of the sluice feed is nearly fully exposed to the column of lime mud located above it. It is an alternative that the tube valve be held pulsating such that it releases its grip at a higher frequency than the frequency of the exposure of the pockets of the sluice feed.

It is possible by synchronised operation to avoid continuous contact between the walls of the sluice feed and the descending column of lime mud, and the power required for the operation of the sluice feed and wear on it can both be reduced.

The sluice feed 13 does not need to be designed with a small play between the housing of the sluice feed and the wings of the sluice feed since the greater part of the fall in pressure is located across the column of lime mud that has been established in the tube valve. The play in the sluice feed can be allowed to be as great as up to 2-10 millimetres. It is possible that the sluice feed be provided also with clearing air for the emptying of chambers at the lower position.

FIG. 1 shows schematically the design of the control system, where a control unit 20 detects the position of the sluice feed through a signal line A, preferably by detecting pulses in a conventional manner from a pulse sensor arranged on the motor shaft of the motor M2. The control unit 20 subsequently activates the regulator valve 21 through the signal line B such that the valve takes up one of two positions: either such that the tube valve is connected to the same excess pressure as that prevalent in the filter 1 or such that the tube valve is connected to a lower pressure, such as atmospheric pressure. The control unit 20 detects also the level in the tube valve through the signal line C in order subsequently to control the rate of revolution of the sluice feed through the signal line D such that a minimum level can be maintained in the tube valve.

During testing of a prototype output unit with a tube valve that has an internal diameter of 112 mm and with a tube wall of thickness 8 mm, it has been possible to implement a strain (release) of the tube valve that corresponds to an increase in internal diameter of 6 mm at a regulated pressure difference of 0.8 bar, and of 11 mm at 1.2 bar. An increase in diameter of 14-28 mm could be established with an excess pressure of approximately 1.5 bar applied in the filter. Thus a regulatory function is obtained when operation has been established in which the tube valve preferably undergoes a controlled small change in diameter in the interval 5-10%, while an increase in diameter of as large as 25% can be obtained if this is required.

It is possible to maintain the difference in pressure, and thus also the increase in diameter of the tube 142, as low as possible, in order to minimise pressure losses (leakage flows) across the tube valve. Testing carried out with the prototype showed that a difference in pressure of 0.7 bars, which gave an increase in diameter of 6 mm, was fully sufficient. It was possible in these conditions to maintain the leakage flow of free air down at the level of 3-4 m³/h.

The frequency of the release in the prototype was 8-36 times per minute, and a rate of flow of 1-3 cm/s through the output unit was established. The cell feed, which had five cells and a total volume of 3 liters, was driven at a rate of revolution of 2.3-9 rpm.

While the present invention has been described in accordance with preferred compositions and embodiments, it is to be understood that certain substitutions and alterations may be made thereto without departing from the spirit and scope of the following claims.

The invention claimed is:

1. A causticization process for a reception and transport of lime mud from a continuously operated pressurized filter that maintains an excess pressure of at least 0.5-2 bar, comprising:
   providing a filter having at least one filter element that is covered with a filter screen and partially submerged in a liquid mixture that contains lime mud and partially located in a gas phase above a level of the liquid mixture,
   separating a filtrate from the lime mud by withdrawing the filtrate through the filter screen of the filter element while rotating the filter element the liquid mixture and the gas phase to dry lime mud collected on the filter element,
   releasing the dry lime mud from the filter element,
   the dry lime mud falling into a reception chute arranged above the level of the liquid mixture,
   maintaining a level of dry matter content of the dry lime mud of 65-90%,
   coupling the reception chute to a horizontal collection pipe,
   a transport screw, disposed inside the horizontal collection pipe, feeding the dry lime mud to an outlet chute arranged at one end of the horizontal collection pipe,
   providing the outlet chute with a tube valve having a flexible inner tube,
   feeding the dry lime mud into the tube valve to form a column of dry lime mud inside the tube valve,
   the flexible inner tube holding the column of dry lime mud inside the tube valve,
   the column of dry lime mud forming a pressure lock inside the tube valve,
   lowering a pressure outside the flexible inner tube and expanding the flexible inner tube,
   the flexible inner tube releasing the column of dry lime mud, and
   a rotating cell feed, arranged under the tube valve, feeding out the released column of dry lime mud from the tube valve and feeding the dry lime mud to a lime kiln.

2. The process according to claim 1, wherein the process further comprises coupling several reception chutes to the horizontal collection pipe.

3. The process according to claim 1 wherein the process further comprises providing a pressure chamber that surrounds the flexible inner tube.

4. The process according to claim 3 wherein the process further comprises connecting the pressure chamber to a source of pressure.

5. The process according to claim 1 wherein the process further comprises feeding the dry lime mud to the outlet chute via a plug-breaker that finely divides any lumps in the dry lime mud.

6. The process according to claim 5 wherein the process further comprises rotating the plug-breaker.

7. The process according to claim 6, wherein the process further comprises connecting a level monitor to the outlet chute and the level monitor controlling a rate of revolution of the rotating cell feed.

8. The process according to claim 1 wherein the process further comprises pre-stressing the flexible inner tube so that an outside surface of the flexible inner tube has a concave shape when a pressure inside the flexible inner tube is identical to a pressure outside the flexible inner tube.

9. The process according to claim 8 wherein the process further comprises setting the pressure outside the flexible inner tube to be identical to the pressure inside the flexible inner tube and the concave form of the flexible inner tube holding the column of dry lime mud inside the tube valve.

* * * * *